United States Patent
Wacker et al.

[15] 3,662,242
[45] May 9, 1972

[54] DIGITAL SERVO POWER DRIVE CONTROL INCLUDING VELOCITY UPDATING

[72] Inventors: Charles J. Wacker, New Brighton; George W. Miller, Anoka; James B. Dietel, Minneapolis, all of Minn.

[73] Assignee: FMC Corporation, San Jose, Calif.

[22] Filed: May 13, 1970

[21] Appl. No.: 36,747

[52] U.S. Cl.................................318/573, 318/595, 318/605, 318/616
[51] Int. Cl......................................G05b 19/24, G05b 5/01
[58] Field of Search....................318/573, 595, 605, 616, 636

[56] References Cited

UNITED STATES PATENTS

| | | | |
|---|---|---|---|
| 3,539,897 | 11/1970 | Sommeria | 318/616 X |
| 3,465,332 | 9/1969 | Neal et al. | 318/636 X |
| 3,040,221 | 6/1962 | Fitzner | 318/573 |
| 3,035,214 | 5/1962 | Kelling | 318/605 X |

Primary Examiner—T. E. Lynch
Attorney—F. W. Anderson, C. E. Tripp and R. S. Kelly

[57] ABSTRACT

Digital signal orders are received at preset time intervals from a computer which signals indicate the desired angular position of a rotatably mounted load, such as a missile launcher mount. Velocity orders are derived from the position orders and both the velocity and position orders are converted to analog signals. A servomechanism is provided wherein the mechanical response of the load and the position signals provide continuous inputs for a synchro control transformer the output of which indicates the error in load position. The error signal is transmitted to a power drive system to drive the load after it has passed through a sample and hold controller which samples normally only at the time when a new position order is received but which may be operated to sample a plurality of times between position orders when an error of more than a predetermined amount is present.

26 Claims, 9 Drawing Figures

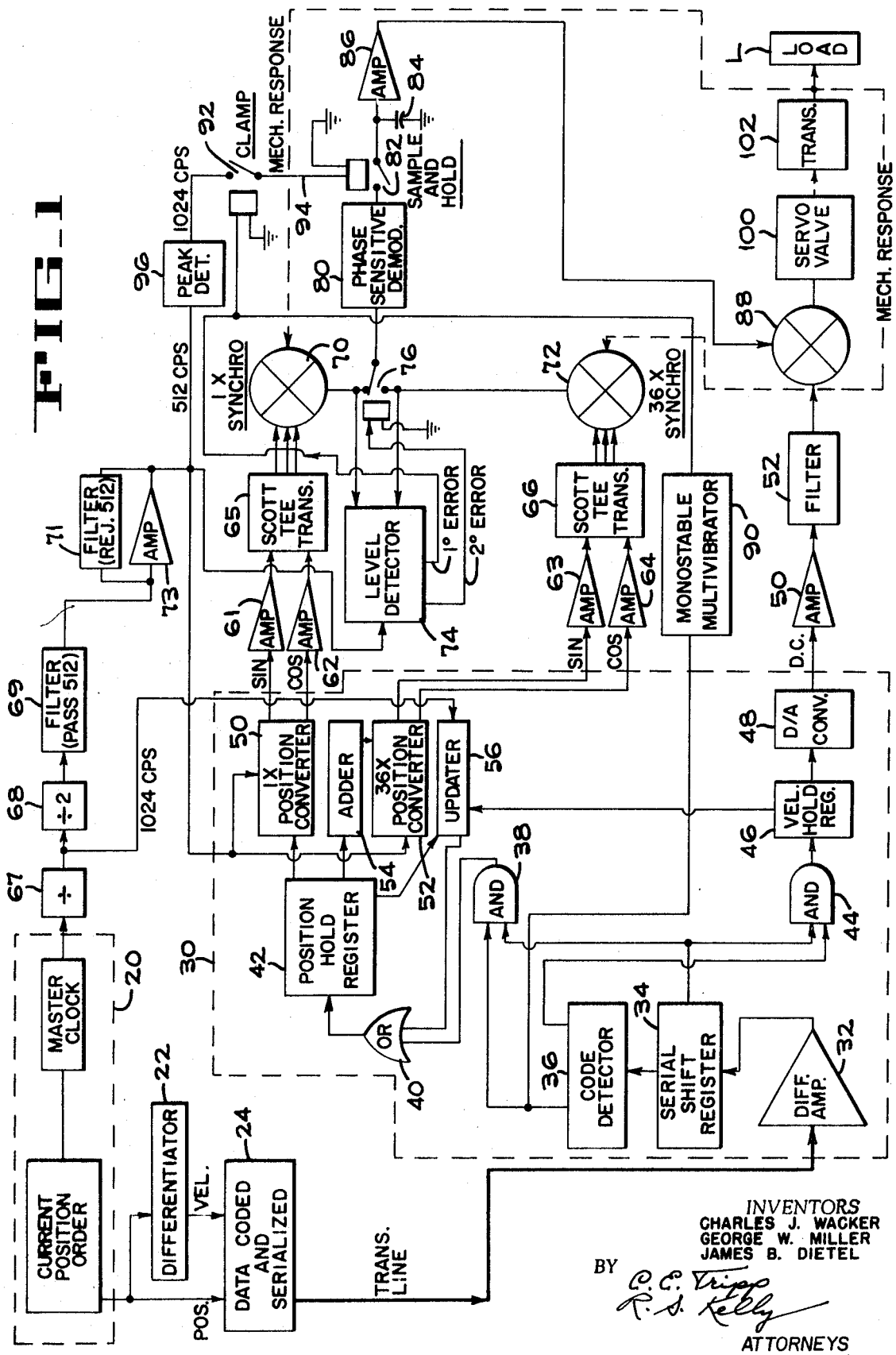

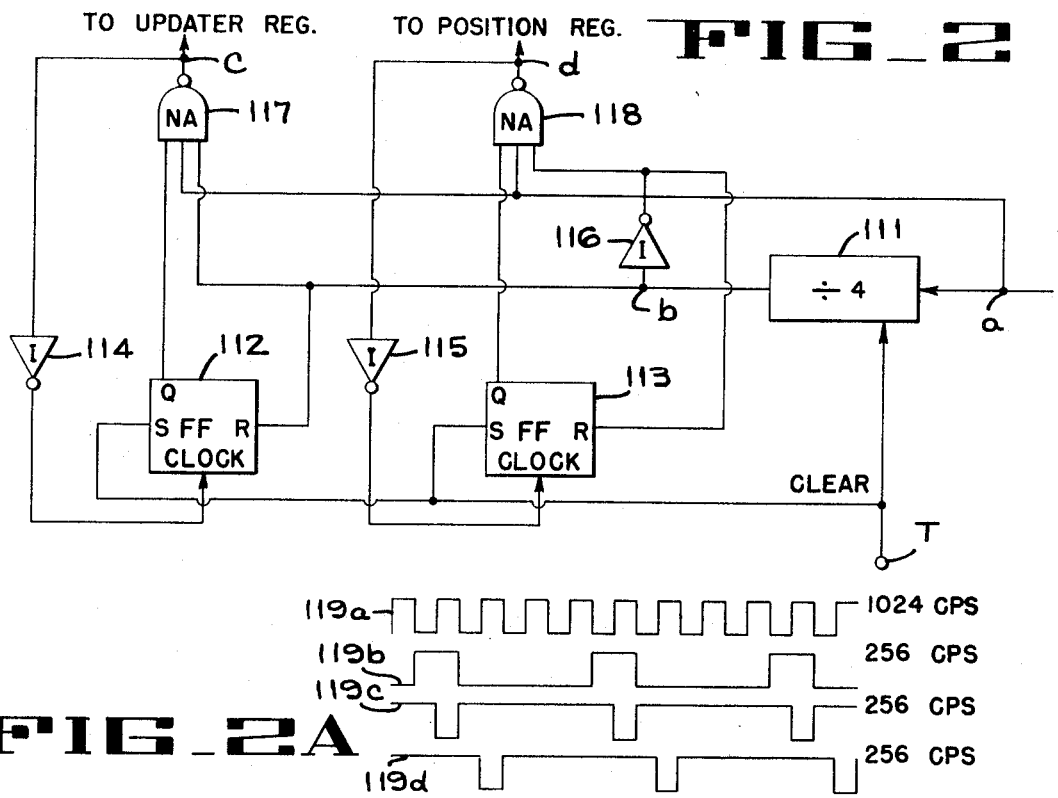
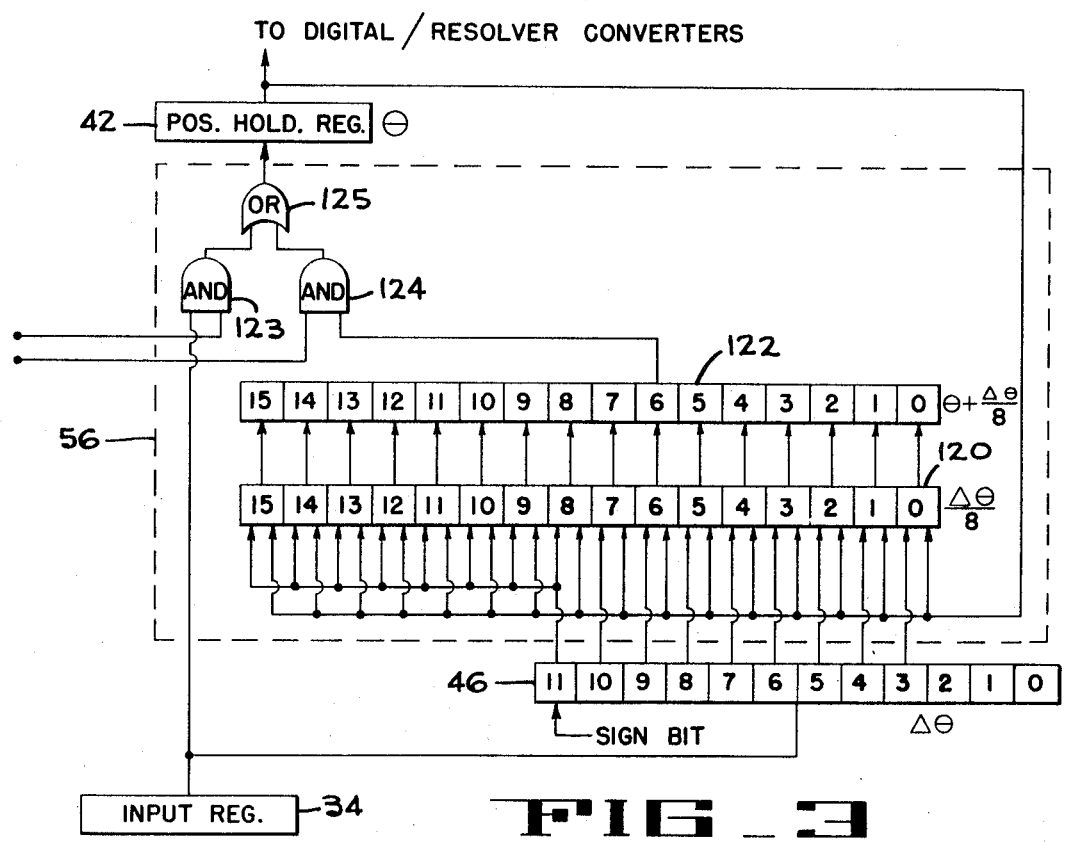

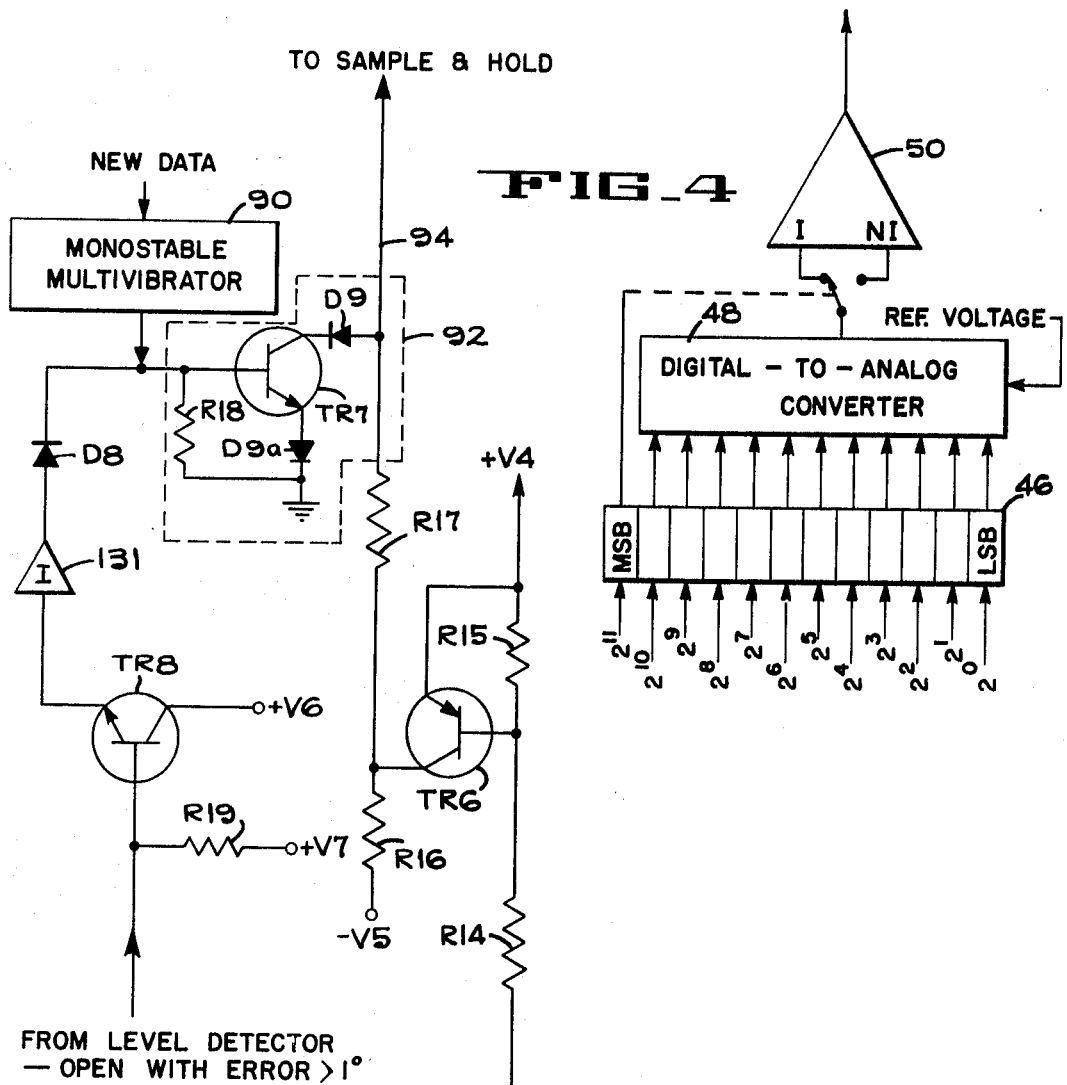

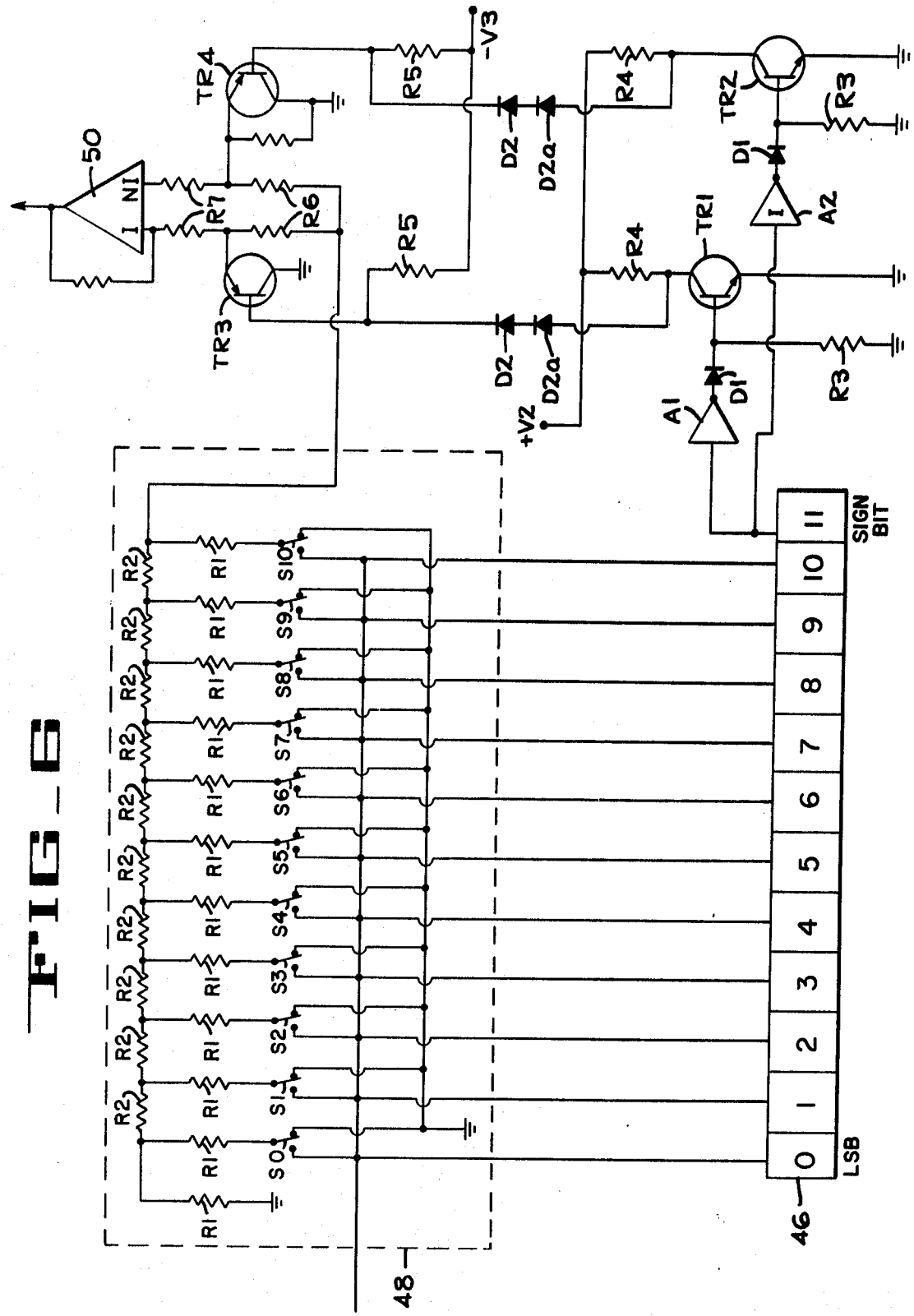
FIG_6

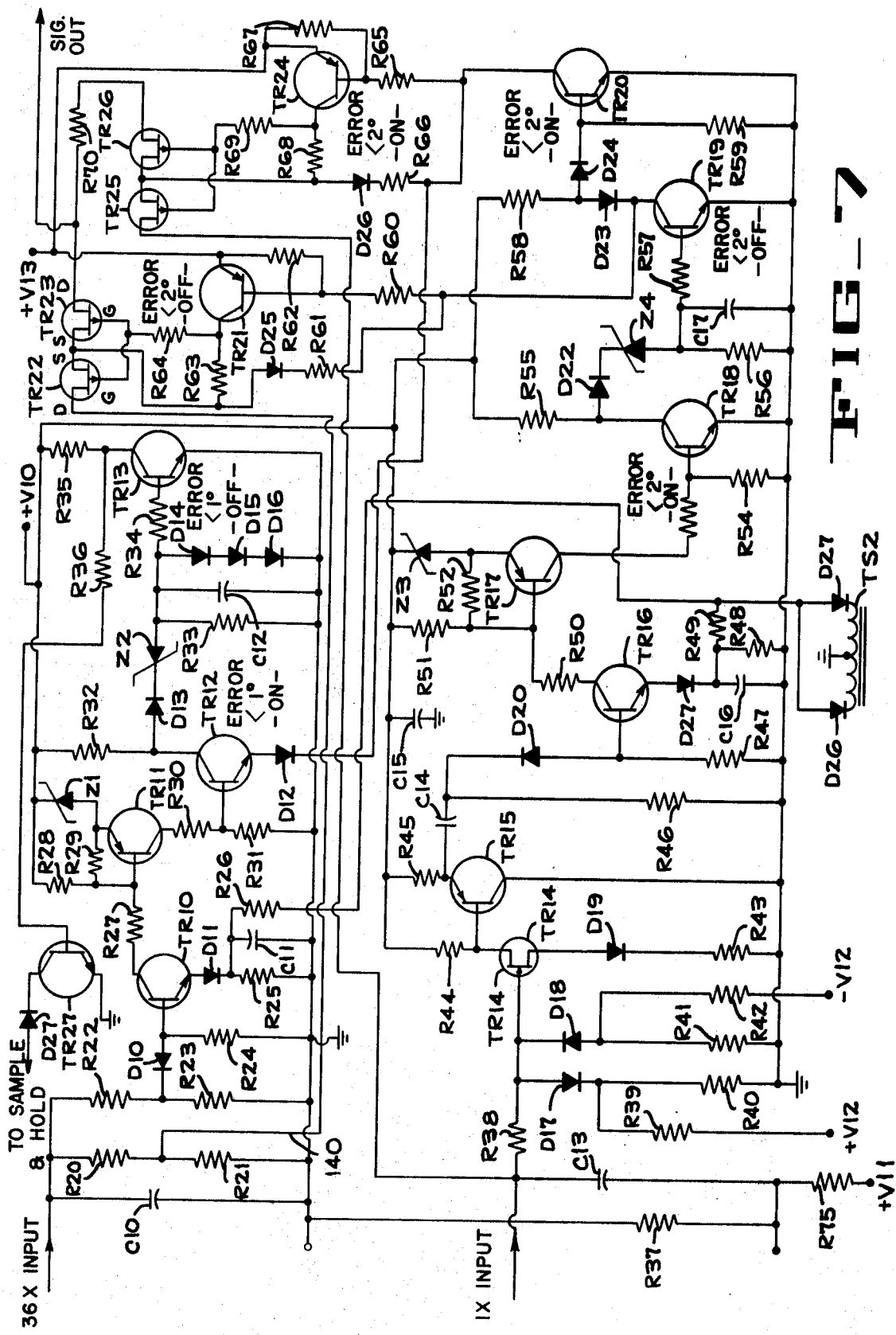
FIG_7

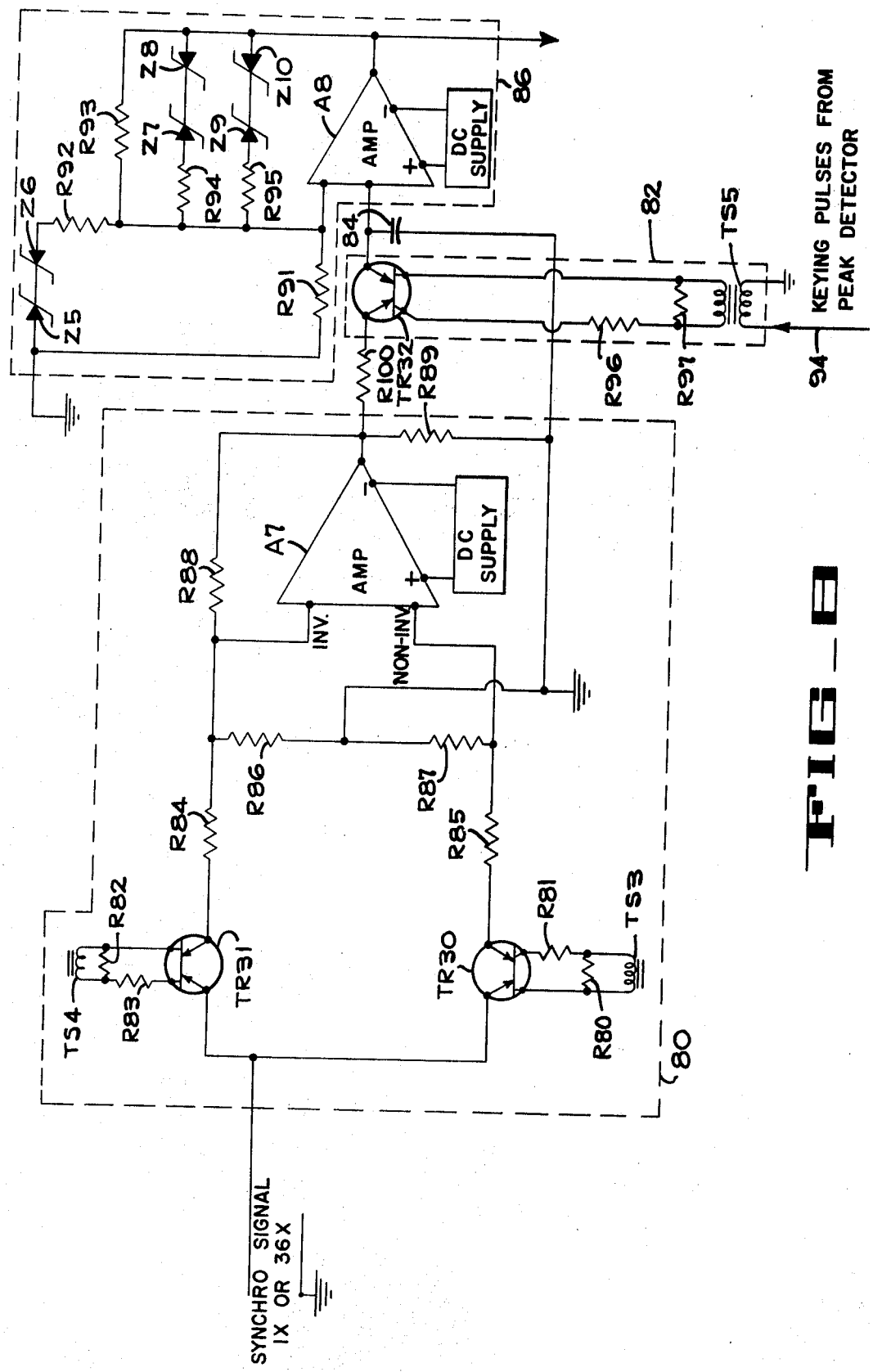
FIG_8

DIGITAL SERVO POWER DRIVE CONTROL INCLUDING VELOCITY UPDATING

BACKGROUND OF THE INVENTION

1. Field of the Invention

The present invention pertains to control systems that are provided with digital input orders for the control of rotatably mounted loads, and more particularly, it pertains to a control system which utilizes a positioning servo system including synchro control transformers and which therefore requires digital-to-synchro signal conversion.

2. Description of the Prior Art

The control of the movement of relatively large loads and their power drives has for many years posed problems for conventional control systems because of the response limitations of the response limitations of these systems and the difficulties involved in achieving stability. A particular load and drive train arrangement which has in the past necessitated complex and costly control systems is a rotatably mounted load such as a gun mount or a missile launching platform and its hydraulic transmission drive as might be used by the military. Control systems for this type of load and drive train have heretofore been almost entirely analog systems which have been plagued with significant problems in reliability and response and which have required equipment of extreme complexity with a general lack of flexibility. Of course, such analog systems have proven to be quite expensive both in initial cost and in the cost of maintenance.

It has now been proposed that digital signal orders from a general purpose computer be utilized for the control of large rotatably mounted loads such as gun mounts. The problem then is interfacing the digital orders with the analog control system components heretofore utilized to directly drive the load. Typically, such components will include a positioning servomechanism controlled by synchro control transformers. Attempts have been made to convert digital position orders into analog signals which can then be used in a more or less conventional servomechanism unit to provide a continuous output for positioning the load. However, none of these conversion systems have provided a wholly reliable control system due to the inherent difficulties in properly correlating the discontinuous digital signals of the command system with the continuous analog devices controlling the distribution of power to the load.

Digital-to-synchro converters or digital-to-resolver converters are in general use in various fields. For example, in machine tool control systems, such converters have been utilized to connect digital input information into synchro or resolver signals for control of the movement of the machine tool. However, all of such prior art converters and related conversion systems generally require a considerable amount of hardware including components of large size in order to obtain a sufficient degree of resolution or they require complicated mechanisms which are expensive and difficult to maintain in proper working order. Moreover, a basic problem exists in all of such prior art conversion techniques in that errors are introduced by the conversion equipment itself. In transforming digital input signals into analog output signals by conventional sampling processes, errors are generally introduced which degrade the stability of the power drive system.

SUMMARY OF THE INVENTION

The control system of the present invention utilizes digital position orders, from a computer for example, converts these positions orders into synchro signal voltages, and processes the synchro signal voltages to operate a positioning servomechanism mechanically connected to a rotatably mounted load. A velocity order may be derived from the position orders in digital form and will be separately converted into an analog signal for use in the control of the positioning servomechanism. The load response is mechanically connected to a synchro control transformer the input of which is the desired position signal after conversion from digital to analog form. The output of the synchro control transformer is therefore an error signal representing the error between the desired position of the load and the actual position of the load. This error signal may be summed with the converted velocity signal and the resultant combined signal may be utilized to drive electro-mechanical equipment of conventional design for movement of the load.

Since the digital position orders are only accurate at the instant when the position order is received, the error signal from the synchro control transformer must be sampled so that it is transmitted only at the times when the position orders are correct; this can be accomplished by a sample and hold circuit including a sampling switch and an integrating capacitor. However, when the error signal indicates a positional error in the load greater than a predetermined angular amount, sampling is automatically obtained at a much greater rate in order to introduce stability to the system and to prevent the mechanical power drive at the load from reflecting the discontinuous digital input.

A feature of the present invention which is utilized in conjunction with the sample and hold circuitry is the provision of an updater in the input to the digital-to-synchro converter. This updater utilizes the information from the derived digital velocity signal to continuously update the digital position signal between each pair of consecutive digital position orders. Consequently, when sampling is occurring at the increased rate, the updated signals will be utilized by the positioning servo in order to obtain smoother operation and greater reliability. The use of an updater also minimizes the danger of large transient voltages in the synchro control transformer and thus preserves the life and reliability of this basic unit of the control system.

Another feature of the present invention is the digital-to-analog conversion unit for the velocity signal. This conversion unit utilizes a conventional resistance ladder network for performing the digital-to-analog conversion; however, special means are provided wherein the direction of the velocity signal as well as its amplitude will be processed so that a DC voltage output will be provided by the converter which will be of either negative or positive potential to indicate the desired direction of rotation of the load.

The digital power drive control system of the present invention has significant advantages over similar systems presently in existence in that its reliability and response rate are high while the circuitry is basically simple so that it can be constructed with a minimum amount of hardware to occupy a minimum amount of space. The techniques utilized in carrying out the digital-to-analog conversion make it possible to obtain satisfactory performance at low data sampling rates. For example, the control system to be described hereinafter has been operated at input rates of 32 digital orders per second, and the digital input rate could be significantly lower without seriously affecting the operation of the control system.

BRIEF DESCRIPTION OF THE DRAWINGS

FIG. 1 is a block-diagram representation of the control system of the present invention.

FIG. 2 is a schematic diagram illustrating the updater clock logic and timing circuitry.

FIG. 2A is a timing diagram of the waveforms at various indicated points in the logic and timing circuitry of FIG. 2.

FIG. 3 is a schematic representation of the updater and the position holding register illustrating the manner in which the updated position orders are supplied.

FIG. 4 is a schematic representation of the digital-to-analog converter for the velocity signals.

FIG. 5 is a schematic diagram of the circuitry for the peak detector and the clamping circuits for the sample and hold unit.

FIG. 6 is a schematic diagram of the circuitry for the digital-to-analog converter illustrated in FIG. 4.

FIG. 7 is a schematic diagram of the circuitry for the level detector.

FIG. 8 is a schematic diagram of the circuitry for the demodulator, sample and hold unit, and the non-linear shaping amplifier for the error signal.

DESCRIPTION OF THE PREFERRED EMBODIMENT

A functional block diagram representation of the complete control system of the present invention is set forth in FIG. 1 of the drawings. The input to the control system is provided by a digital computer 20 where position orders are generated at a predetermined frequency. The embodiment of the present invention to be described hereinafter is adapted to accept new position orders at the rate of 32 orders or digital signals per second from the computer. In a practical application of the control system of the present invention such orders may be generated by fire control systems; for example, they may be generated by a general multipurpose computer on a naval vessel utilizing information from target tracking devices and attitude indicating gyroscopes, and the control system of the present invention will then process the digital orders to provide the drive for a gun mount or missile launching mount.

Consecutive position orders are differentiated by a conventional digital differentiator 22 to provide a current velocity signal in addition to the current position signal. This velocity signal at any given time will represent the difference between the current position order and the preceding position order that has occurred during the known time interval between consecutive orders. A conventional digital processor 24 is then utilized to code and serialize the two signals which are to be transmitted to the remainder of the control circuitry located at or near the load. While it is desirable to generate the velocity signal at the computer, either by the computer itself or by a separately located differentiator as shown, the processing of the digital position signals can be accomplished after transmission to the digital input circuitry at the load. Thus, only the digital position order signal need be supplied by the computer and transmitted if desired. Also, it will be obvious that the signal transmission may be in parallel format rather than serial if desired.

The digital-to-analog conversion unit is shown diagrammatically in FIG. 1 and is enclosed within the large block 30. The function of this converter is to accept digital data, check it for accuracy, identify it, route it to the correct destination, and convert it to analog signals. A differential amplifier 32 matched to the impedance of the transmission line receives the incoming signal and end shifts it into a serial shift register 34 which holds the digital order until a subsequent signal is transmitted. A conventional binary code detector 36 is used to process the signal by breaking it down into its two components, i.e., the digital position order and the digital velocity order. If the position order passes the normal parity checks in the code detector it will be transmitted through the "and" gate 38 when the end bit in the serial shift register is filled to indicate the reception of the complete signal in the register. The position order is passed from the gate 38 through an "or" gate 40 to a position holding register 42. In a similar manner the digital velocity order is shifted by conventional digital hardware to a velocity holding register 46 from the serial shift register 34 through an "and" gate 44 where it is "anded" with the pulse signal from the code detector indicating the presence of valid data in the serial shift register. The transfer of the digital information from the serial shift register into the holding registers 42 and 46 is preferably a parallel transfer.

A special feature of the present invention is the use of an updater 56 which continuously updates the position holding register 42 during the period when a single order is received from the computer 20. The updater utilizes information from the velocity holding register 46 and is activated a predetermined number of times between the reception of each new position order to update the position order in accordance with the predicted velocity as determined by the two previous position orders. In the embodiment of the invention described (where the input is at a rate of 32 orders/second), the position holding register will be updated seven times between each position order from the computer so that the updater will function to add one-eighth of the predicted velocity to the updated position order at a rate of 256 updated orders/second.

The updated digital position order in the holding register 42 is next broken down into two components, a one-speed or coarse signal and a 36-speed or fine signal before it is converted into an analog signal. As is conventional in power drive systems for gun mounts and the like, both a coarse control and a fine control are present so that synchronizing operations can be handled smoothly at maximum response rates. Assuming a 16-bit digital position signal in the position holding register 42, two 11-bit position signals will be separately processed in a one-speed position converter 50 and 36-speed converter 52 with the converters each serving to transpose the digital information into a pair of analog resolver signals the amplitude of which represent the sine and cosine of the indicated angular position order. It will be appreciated that the digital representation of the angular position order will be in conventional binary code format, i.e., where each bit will represent the division by two of the angles indicated by the next higher ordered bit. For example, the most significant bit will represent an angle of 0° or 180° depending upon whether or not the bit is in the "0" state or in the "1" state, respectively. The next most significant bit represents 0° or 90°, and the next most significant after that represents 0° or 45°, etc. The summation of all of the bits thereby indicates the angle represented by the digital signal into the converters. In the embodiment of the present invention described, with a 16-bit digital position signal, there are $2^{16}$ or 65,536 discrete angles selectable thereby providing a resolution of approximately 20 seconds of arc.

The one-speed position converter 50 will receive in its holding register the most significant 11-bits. For the 36-speed position converter 52, a binary adder 54 is utilized. Of the 16-bit position order in the position holding register 42, the least significant 11-bits (representing a 32-speed order) and an 11-bit signal omitting the two most significant bits and the three least significant bits (a four-speed signal) are added together with the sum thereof representing a 36-speed signal.

The one-speed and 36-speed position converters 50 and 52 may be any of numerous digital-to-resolver or digital-to-synchro converters which are presently available. However, a digital-to-resolver converter has been specially designed for use with the control system of the present invention. This converter is shown in our copending application Ser. No. 888,688, filed Dec. 29, 1969, and reference to said application may be had for a complete description of the details of the converters.

The reference voltage or carrier voltage for the resolver signals will be supplied to the converters 50 and 52 and will be derived from the master clock in the computer 20 so that the digital input orders can be synchronized with the operations in the analog portion of the control circuitry. Pulses from the master clock are passed through a conventional frequency divider network 67 and through a "divided-by-two" network 68 which will provide a synchro power voltage at a frequency of 512 cycles/sec. This voltage is filtered in a narrow band pass filter 69 and passed through an amplifier 73 with a feedback filter circuit 71 rejecting 512 cps to obtain a well regulated sure sine wave voltage which will form the reference signal for the entire analog portion of the system and synchronize the timing thereof with the digital input.

The resolver signals from the output of the converters 50 and 52 will be AC signals of a predetermined frequency (to be elaborated upon hereinafter) and with an amplitude that is proportional to the sine and cosine of the angle indicated by the digital position order as previously pointed out. The sine and cosine signals from both the one-speed converter 50 and the 36-speed converter 52 are separately processed through conventional amplifiers 61 and 62 and 63 and 64, respectively, and are directed to conventional Scott Tee transformers 65 and 66, respectively, where they are transformed into three-wire synchro signal voltages for input to a pair of synchro control transformers 70 and 72, respectively.

The synchro control transformers or synchros 70 and 72 are the primary electronic control units for maintaining the desired angular position of a load L. The response from the load is mechanically connected to the rotors in each of the synchros to provide the synchros with continuous information indicative of the actual load position. The synchro signal voltages are impressed upon the stators of the synchros to provide the desired positional information. The voltages induced in the windings of the rotor will therefore be proportional to the difference between the desired and actual position of the load, i.e., each rotor voltage will represent an error signal.

The signals from both the one-speed synchro and the 36-speed synchro are processed through a level detector circuit 74 which senses the magnitude of the signals. When the error is greater than 2° the level detecting circuitry actuates a switch 76 so as to connect the one-speed synchro to the output. When the error is less than 2° the level detector switches the 36-speed synchro to the output to achieve higher accuracy in synchronizing the load to the desired angular position. The level detector also senses a 1° error level for a purpose to be explained more fully hereinafter.

The synchro error signal, after passing through the switch 76, is demodulated by a phase sensitive demodulator 80 in order to eliminate the AC synchro voltage therefrom while retaining the envelope thereof which defines the magnitude of the error. The demodulator is phase sensitive so that the direction of the error and desired load movement may be ascertained. From the demodulator the error signal is processed through a sample and hold unit including a sampling switch 82 and an integrating capacitor 84. The integrated output of the capacitor is then processed through a non-linear shaping amplifier 86 and is directed to a summing junction 88.

The sample and hold unit comprises one of the principal features of the present invention. The sampling switch 82 is normally operated so that the error signal is sampled only at the instant when a new position order is received from the computer 20. Obviously, this is the only time that the position order will be entirely accurate since the input is discontinuous. This is accomplished by means of a monostable multivibrator or "one-shot" circuit 90 which receives its triggering pulse from the code detector pulse output indicating the reception of a valid order in the serial shift register 34. The output of the multivibrator is a pulse of a predetermined width. The pulse is utilized to close the clamping switch 92 for a short time period as determined by said pulse width and allow high frequency, short duration pulses to be conducted through a line 94 to close the sampling switch and allow transfer of the error signal voltage to the integrating capacitor 84. The pulses in the line 94 are derived from peak detector circuitry 96 which full-wave rectifies the 512 cps synchro power voltage and provides short duration pulses at the positive and negative peaks thereof. The clamping switch 92 will also be closed by an output signal from the level detector 74 whenever the error signal indicates a position error greater than 1°.

The digital velocity orders, as explained previously, are separately converted from the position orders into DC signals. From the velocity holding register 46 the digital velocity order is transmitted in parallel form to a digital-to-analog converter 48 which utilizes both the sign (as provided by the most significant bit) and the amplitude of the digital signal (as provided by the other 11 bits) and puts out a DC signal of an amplitude and sign corresponding to the indicated binary input. The DC output is transmitted through an amplifier 50 and a low pass filter 52 to the summing junction 88 where it is summed with the position error signal.

The velocity order signal and the position error signal are added together vectorially at the summing junction 88 and the sum, which is a DC signal, is transmitted to an electro-hydraulic servo valve 100 which converts the electrical signal to a hydraulic signal. The hydraulic signal, in turn, is utilized to operate the stroking pistons of a hydraulic transmission 102 which is mechanically connected to the load L through a suitable gearing arrangement. As previously explained, the mechanical response from the load is fed back to the synchro control transformers 70 and 72 to complete the response loop and provide the positioning servomechanism portion of the control system.

The non-linear amplifier 86 for shaping the position error signal, the summing junction network 88, the electro-hydraulic servo valve 100, and the hydraulic transmission 102 are all conventional items in hydraulic drive systems for gun mounts or missile launcher mounts. For a description of such items as might be utilized in the control system of the present invention reference is made to the publication of the Bureau of Naval Weapons, NAVWEPS OP 3115 (Volume 2).

The various functional units of the control system of the present invention, other than those which are wholly conventional or those for which reference to other sources has been made, will now be described in detail.

UPDATER

The updater circuitry is diagrammatically shown in FIGS. 2 and 3. Under conditions of high error the position order can be changing quite rapidly between consecutive orders or samples at the 32 order per second input rate from the computer. To avoid roughness in the response and overshooting while the control system is synchronizing, i.e., reducing the error in the angular position of the load to a minimum amount, it has been proposed to update the current position order a certain number of times between each pair of orders received from the computer. The updated position orders are generated artificially within the control system by utilizing the digital velocity order which is representative of the displacement in position during the preceding sampling period, i.e., between the two previous position orders from the computer. In order to attain the intermediate updating, the velocity signal is divided into N equal parts which are separately added to the position order N times between each pair of position orders at the input from the computer. If N is a power of 2, division of the binary order is very simple and requires little additional hardware. In the embodiment of the invention shown, the sampling period, one thirty-second of a second, is divided into eight equal parts so that the position order will be updated seven times between samples or input orders.

With the basic sampling or input rate at 32 signals per second the updater will require clocking pulses at eight times that rate or at 256 cycles per second. To obtain such clocking pulses for the updater the master clock from the computer passes a signal through the frequency divider network 67 to provide a signal with a frequency of 1,024 cycles per second which signal can then be transmitted to a further frequency divider network 111 (FIG. 2) which divides the signal frequency by 4 to provide the required clocking pulses at 256 cycles per second.

The clock logic and timing circuitry for the updater 56 is shown in FIG. 2. The timing pulses from the master clock in the computer are received in the "divide-by-four" network 111 at the input of the updater. The output from the divider network 111, at one-quarter the input frequency, is connected to "nand" gates 117 and 118 which supply the clocking pulses for an updater holding register and for the position holding register, respectively. The transmission of the pulses from the divider network to the position holding register "nand" gate 118, however, is through an inverter 116 so that the updater register, where the updated position order is stored, will be provided with a clocking pulse prior to the position register. The "nand" gates 117 and 118 are preconditioned by the flip-flop circuits 112 and 113, respectively, and the flip-flops are, in turn, clocked by the output of the "nand gates" through inverters 114 and 115. The conditioning input to the "nand" gates which is provided by the output of the divider network is tied to the reset input on the associated flip-flop so that the flip-flops will be reset after each pair of clocking pulses are transmitted to the holding registers. Means are also provided at an input terminal T whereby a clearing signal is provided when a new position order is received in the position holding register from the computer which signal serves to reinitiate the count in the "divide-by-four" network 111 and to reset the flip-flops 112 and 113. While the clearing of the timing circuitry is not strictly necessary since the new position order should be precisely synchronized with the eighth updated position order, by clearing after each sample period no errors will be permitted to accummulate to invalidate the updated orders.

FIG. 2A illustrates the waveforms at various points in the circuitry of FIG. 2. The input at point a to the "divide-by-four" network is shown by the waveform 119a as a pulse train at 1,024 cycles per second. The output of the "divide-by-four" network at point b is illustrated as the signal 119b wherein one positively moving pulse is provided for each four input pulses. Upon the reception of a new number into the position holding register 42 directly from the computer the "divide-by-four" network is cleared and will count four input pulses. As the fourth input pulse goes low, the output of the divider network will go high to condition the "nand gate" 117. Upon the next half cycle of the input wave 119a, all of the inputs to gate 117 will be high and an output pulse will be provided at c which will clock the updater register to accept the first updated position order. One half-cycle later the output of the divider network at b will go low thereby conditioning "nand" gate 118. One half-cycle after gate 118 is conditioned the input at a will go high to cause an output at d from gate 118 thereby providing the clocking pulse for the position holding register which can then accept the new updated position order from the updater register. The waveform for the pulses to the updater register is shown as 119c in FIG. 2A and the waveform for the clocking pulses to the position register is shown as 119d.

The flip-flops 112 and 113 which provide one of the conditioning inputs to each of the "nand" gates 117 and 118 are reset automatically by the circuitry disclosed and are clocked to provide a conditioning pulse on their respective "nand" gates by feedback from the points c and d through inverters 114 and 115, respectively. When a new output pulse (waveform 119b) is put out by the divider network 111 the foregoing cycle is repeated until seven updated position orders have been received in the position register. When the eighth updated position order is generated the updating circuitry will be locked out so that the position holding register 42 will receive the new position order from the computer rather than the updated order and the timing circuitry will be cleared so that a new updating cycle will be initiated.

The operation of the updater will be described with particular reference to FIG. 3 of the drawings. At the beginning of each sample period a derived velocity order will be stored in the velocity holding register 46 and a position order from the computer 20 will be stored in the position holding register 42. The magnitude of the velocity order represents the angular distance $\Delta\theta$ that the position order $\theta$ will have moved in the previous sample period, i.e., the previous one thirty-second of a second. This velocity $\Delta\theta$ can then be divided by 8 to give angular incremental distances which the position order will predictably move in each one two hundred fifty-sixth of a second of the subsequent sample period. By adding the small change in angular position $\Delta\theta/8$ to the position holding register at a rate of 256 times per second, a moving position order will be generated that will exactly match the indicated velocity order.

At the start of the updating cycle, with a new position order $\theta$ in the position holding register 42 and a new velocity order $\Delta\theta$ in the velocity holding register 46, the timing circuitry of FIG. 2 will be initiated to count one two hundred fifty-sixth of a second at which time a clocking pulse will be provided for the updater holding register 122. The updater also includes a 16-bit adder 120 as shown in FIG. 3 which functions to add one-eighth of the velocity order $\Delta\theta/8$ to the sum stored in the position holding register to provide an output equal to $\theta + \Delta\theta/8$ which quantity is transferred into the 16-bit updater holding register when the clocking pulse is provided by the timing circuitry. The process of dividing a binary number by 8 can be accomplished simply by shifting the signal three places in the binary adding register 120, as shown in FIG. 3, and this can be accomplished by shifting the wire between the velocity holding register and the adder register so that no special circuitry is required. Once the sum $\theta + \Delta\theta/8$ has been clocked into the updater holding register, it will be clocked therefrom into the position holding register at the next timing pulse or one two hundred fifty-sixth of a second later through "and" gate 124 and "or" gate 125. The new quantity in the position holding register will now be added to the pre-set quantity $\Delta\theta/8$ and the cycle will be repeated six additional times during each one thirty-second of a second sample period. On the eighth updating cycle a new order is received from the computer which enters the position holding register through "and" gate 123 and "or" gate 125. The "and" gates 123 and 124 are controlled so that the gate 124 is locked out when the new order is received in the serial shift register 34 and gate 123 is locked out during the subsequent updating cycle; that is to say, only one gate 123 or 124 will be conditioned to pass a signal at any given time.

One important advantage of the use of the updater is the fact that the continual updating of the position order prevents large changes in the angular position signals that are transferred into the digital-to-resolver converter circuitry. Since this converter circuitry is conventionally either an inductive or a resistive ladder network, it is imperative that large transient voltages be avoided. One successful way of avoiding the large transient voltages is to maintain small incremental changes in the position signals regardless of the data rate. The updater also permits a smoother and more rapid response when the control system is synchronizing, i.e., when the error is high as will be elaborated upon further hereinafter.

DIGITAL-TO-ANALOG VELOCITY SIGNAL CONVERTER

The basic operation of the digital-to-analog converter 48 for the velocity signal is illustrated in FIG. 4. The velocity holding register 46 is an 11-bit register in which the most significant bit (bit 11) is a sign bit indicating the direction of the velocity signal with respect to the current position order, i.e., it indicates either a clockwise or a counterclockwise velocity is to be used to drive the load. The first 10 bits are transferred into the D/A converter 48 the output of which is a DC signal with an amplitude corresponding to the amplitude of the indicated velocity. The sign bit then controls the switching of this DC signal to the operational amplifier 50 so that the signal will be inverted or not inverted in the amplifier in accordance with the indicated negative or positive velocity. The amplification provides a DC output that will later be summed with the error signal from the synchro control transformers 70 and 72.

The circuitry of the digital-to-analog converter 48 and the input circuitry to the amplifier 50 is more specifically shown in the schematic diagram of FIG. 6. A plurality of like resistors R1 are placed in parallel and are interconnected by a second plurality of like resistors R2. The value for each of the resistors R1 is chosen so that it is exactly twice that of the value for each of the resistors R2. Consequently, starting with the pair of resistors R1 at the left hand side of FIG. 6, the impedance into the first resistor R2 will be the parallel combination of the resistors R1, or R2. The serial combination of R2 plus R2 will equal the resistance of R1 which will then be in parallel with the next (the third from the left) resistor R1. This means that parallel combination of resistors R1 is, in effect, in series with the second resistor R2. By carrying the calculated impedance through the circuitry, it can be seen that exactly one-half of the current input to each of the resistors R1 will be transferred through the adjacent resistor R2 to the right in the ladder network and that the current inputs to each resistor R1 will be reduced by a factor of 2 each time they are combined with current from an adjacent resistor R1 to the right. A series of switches S0 through S10 are provided to transfer the information from the velocity holding register 46 through the resistors R1. The output of the least significant bit is directed to the switch S0 and the output of the most significant bit (other than the sign bit) is directed to the switch S10 with the outputs of the intervening bits being directed to the switches S1 through S9 accordingly. One position of each switch grounds the associated resistor R1 and represents the "0" state of the associated bit; the other switch state places a reference DC voltage V1 upon the associated resistor R1 and corresponds to a "+" state of the associated bit. The output voltage at the right hand side of the ladder network will therefore be a DC voltage which is proportional to the magnitude of the binary input signal to the holding register 46. The output impedance will be equal to the value of a resistor R2. The circuitry of the aforedescribed converter is entirely conventional and a circuit which will provide such a conversion operation may be easily constructed from three 4-bit D/A Converters, Model No. UM 1050, supplied by Sprague Electric Company of North Adams, Massachusetts.

The output of the sign bit is directed to amplifiers A1 and A2 the latter of which is an inverting amplifier. When the sign bit is in the "+" state, a signal will be passed through an input network comprising a diode D1 and a resistor R3 to the base of a transistor TR1 to turn the transistor on. In the absence of a positive voltage on the output from the sign bit, i.e., when the sign bit is in the "0" state, transistor TR1 will not be turned on but an inverting amplifier A2 will transmit a positive voltage to the base of a second transistor TR2 through a similar input network D1 and R3 to turn transistor TR2 on. Transistors TR1 and TR2 are each biased by the application of a positive voltage V2 to the collector thereof through a load resistor R4. Current diverting connections are provided in the collector leads of the transistors TR1 and TR2 to provide a path through a pair of diodes D2 and D2a to the base of a second transistor TR3 or TR4, respectively. When transistor TR1 is "on," the collector thereof is grounded and no signal will be transmitted through D2 to turn transistor TR3 off. In a similar manner, when transistor TR2 is "on," no signal will be present upon the base of transistor TR4 to turn it off. However, when either of the transistors TR1 or TR2 are off, voltage V2 will pass a current through diodes D2 and D2a to turn the corresponding transistor TR3 or TR4 off. It will be noted that the bipolar transistors TR3 and TR4 are in the grounded collector configuration, in order to obtain a low DC offset, and that the bases of TR3 and TR4 are normally biased on by negative voltage V3 through the biasing resistors R5. The input signal from the digital-to-analog converter 48 is directed through resistors R6 and R7 to one of the inputs of the operational amplifier 50. The transistor TR3 or TR4 that is "on" will ground the signal on the collector lead between the resistors R6 and R7. Consequently, only one of the inputs to the operational amplifier will be "on" at any given time. It will also be noted that the signal input to the amplifier on the TR3 input side is inverted through the amplifier while the signal input to the amplifier on the TR4 side is not inverted when it passes through the amplifier.

To illustrate the operation of the circuitry shown in FIG. 6, we can assume that the sign bit in the velocity holding register 46 is in the "+" state indicating a positive velocity whereby the transistor TR1 will be turned on and the transistor TR2 will be off. With transistor TR1 on, transistor TR3 is on to ground, the voltage on the inverting side of the operational amplifier A3 but permit the non-inverting input to pass the signal out as a positive DC voltage. While the sign bit is in the "+" state the inverting amplifier A2 will not transmit a signal to transistor TR2 thus keeping TR2 off and turning transistor TR4 off so that the signal from the D/A converter 48 will not be inverted by the operational amplifier 50 and will be passed to the filter 52 as a positive DC voltage. In the reverse case, i.e., when a "0" is present on the sign bit to indicate a negative velocity, transistor TR2 will be turned on and transistor TR1 will be off. This condition will turn transistor TR4 on and transistor TR3 off so that the signal from the digital-to-analog converter will be passed to the inverting input to the operational amplifier so that the output thereof will be a negative DC voltage.

It will be remembered that the velocity order was derived from the 16-bit position orders from the computer 20 over the sample period, i.e., one thirty-second of a second. The least significant bit of the basic 16-bit order therefore represents a velocity of 0.18°/second. If a velocity holding register with 11 bits is provided the maximum velocity which can be generated will be 0.18°/second times $2^{10}$ or approximately 180°/second.

PEAK DETECTOR AND SAMPLE-AND-HOLD PULSE GENERATOR

In order to achieve the sample-and-hold feature of the present invention wherein the error signal is transmitted only at predetermined times, the negative and positive peaks of the 512 cps synchro power voltage are utilized and short duration pulses are derived therefrom to control the opening and closing of the sampling switch 82. FIG. 5 illustrates the circuitry for the peak detector and sample-and-hold pulse generator 96.

Referring now to FIG. 5, a transformer secondary TS1 is utilized to provide synchro power signal voltage at 512 cycles per second which voltage, it will be remembered, is the reference voltage for the synchro input signals. This reference voltage of predetermined amplitude is full-wave rectified by the diodes D4, D5, D6 and D7. A capacitor C1 establishes a negative base voltage for a transistor TR5 by rectification of the reference voltage through diodes D5 and D7 and the biasing network comprising resistors R11 and R13. Current in resistor R8 is diverted through the diode D3 until a peak voltage is supplied to the emitter of transistor TR5 through resistors R9 and R10 and diodes D4 or D6. When the emitter is sufficiently negative, current in resistor R8 is diverted through the base of transistor TR5 to turn the transistor on. The resulting pulse width on the collector of transistor TR5 is established by the biasing network to be between 150 and 200 microseconds. This pulse is insensitive to changes in the reference voltage amplitude since the base voltage on the capacitor C1 which determines the firing of the transistor TR5 is also a function of the reference voltage amplitude. Since the reference voltage source is full-wave rectified, the pulses will occur at a frequency twice as great as the reference frequency or at 1,024 cps.

When transistor TR5 is turned on a second transistor TR6 will also be turned on since the base of TR6 is connected to the collector of TR5 through a resistor R14. Transistor TR6 is biased by a positive voltage V4 on the emitter and base through resistor R15 and by a negative voltage V5 on the collector through resistor R16. When transistor TR6 is turned on (at the peaks of the synchro power reference voltage) the positive voltage V4 will pass a current to the sampling switch 82 through a limiting resistor R17 unless the clamping switch 92 is blocking.

The clamping switch 92 comprises a transistor TR7 which, when turned "on," will divert the pulses in the peak detector output to ground through diodes D9a and D9 and prevent their transfer to the sampling switch 82 on line 94. Transistor TR7 will normally be biased on when transistor TR6 is on by the positive voltage applied through the diode D9 to the collector thereof and a base biasing resistor R18 will maintain the base sufficiently positive to keep the transistor turned on. The transistor TR7 will be turned off only when a sufficiently large negative pulse is applied to the base thereof to permit the peak pulses to pass to the sample-and-hold circuitry. The negative pulses which turn off TR7 may be supplied either by the monostable multivibrator 90 or by the level detector 74.

As previously explained, the multivibrator 90 is energized upon the reception of a complete and valid position order in the holding register. At this time the multivibrator is triggered to provide a negative output pulse of a sufficient width which when applied directly to the gate of transistor TR7 will unclamp the output of the peak detector to the sampling switch (line 94) for a period of time sufficient enough to allow two pulses (at 1,024 cycles per second) to be passed therethrough.

The reason for passing two pulses rather than just one is to allow some setting time in the synchro control transformers after the new input voltage has been switched thereto. That is to say, the error signal will be sampled after the settling time (one one hundred twenty-fourth of a second) but before any appreciable error will have occurred because of the discontinuity of the input orders.

The level detector 74 will also provide a negative voltage to clamping switch 92 when the error is detected to be greater than one degree. As long as the error remains greater than 1° the base of transistor TR7 will be negative enough to prevent the transistor from turning on. During such time all of the peak pulses from the peak detector will be passed to the sampling switch 82 thus allowing error sampling 32 times between each position order input from the computer.

The input circuitry from the level detector 74 to the transistor TR7 is shown in FIG. 5. When the error is detected to be less than 1° the lead from the level detector is grounded so that current from a positive voltage source is diverted to ground through resistor R19 and is not applied to the base of a transistor TR8. When the error is detected to be greater than one degree the lead from the level detector is open so that a positive voltage is applied to the base of transistor TR8 to turn it on thereby permitting voltage V6 to pass a current through the transistor, an inverter 131 and a blocking diode D8 to the base of transistor TR7.

With an error greater than one degree the control system will be synchronizing, i.e., it will be causing the load to move faster than the indicated velocity signal in order to compensate for the accumulated error. It has been found that it is particularly desirable to sample as often as possible while the system is synchronizing in order that errors do not build up to considerable magnitude between each new position order. Error signals of a large magnitude would create excessive velocity requirements in the drive resulting in rough operation and putting a considerable strain upon the hydraulic transmission. Also, problems of overshooting would occur to seriously affect the stability of the load. By sampling on all of the peaks of the synchro power reference voltage the synchro error signal is demodulated and the maximum sampling rate is attained.

LEVEL DETECTOR

The level detector 74 functions to compare the error signal voltages from the one-speed and the 36-speed synchro control transformers 70 and 72, respectively, and to perform certain switching operations depending upon the magnitude of the error. When the error is determined to be less than 2° the 36-speed synchro error signal is transmitted out of the level detector circuitry to the demodulator 80 for application in positioning the load. When the error is determined to be greater than 2° the one-speed synchro error signal is transmitted from the level detector circuitry to the demodulator. The level detector also detects the condition where the error is greater or less than 1°. When the error is less than 1° the output of the level detector turns the transistor TR7 in the clamping circuitry (FIG. 5) on so that the peak pulses from the peak detector are not delivered to the sampling switch 82. When the error is greater than one degree the level detector turns off transistor TR7 to unclamp line 94 to the sampling switch to thereby allow each peak pulse to activate the sampling switch.

The level detector circuitry is shown schematically in FIG. 7. The error signal from the 36-speed synchro control transformer 72 is provided across the parallel combination of a capacitor C10 and a pair of resistors R20 and R21, this network serving to phase shift the signal in order to resynchronize it with the 512 cps synchro power reference voltage. It will be appreciated that the synchro control transformers, being inductive devices, create a phase shift between the input and output signals. If the 36-speed synchro error signal is to be transmitted out of the level detector circuitry it will be provided on a line 140 that is connected between the voltage dividing resistor network R20–R21 which line will pass the error signal to the demodulator 80 through an open contact comprising oppositely-coupled field effect transistors TR22 and TR23.

In order to detect the magnitude of the 36-speed synchro error signal, the signal is attenuated by the voltage dividing resistor network R22–R23 and is provided at the base of a transistor TR10 through a diode D10 which will block the positive half-cycles of the error signal. Transistor TR10 is normally biased on and will only be turned off during the peaks of the negative half-cycle of the error signal when such peaks indicate an error greater than 1°. The biasing for the transistor TR10 is provided from a full-wave rectifier including a transformer secondary TS2 and a pair of diodes D26 and D27. The transformer secondary receives the 512 cycle per second synchro power reference voltage, which, as has been pointed out, will be synchronized with the synchro error signal so that the peaks thereof will occur at the same time. The full-wave rectifier provides a negative voltage upon the emitter of the transistor TR10 as determined by the biasing circuitry comprising resistors R25 and R26 and a capacitor C11. When the negative voltage at the cathode of the diode D10 is of a magnitude which indicates an error greater than 1°, the base loop current through the diode D10 and the resistors R24 and R23 will be great enough to turn transistor TR10 off. Since the collector of TR10 is tied to the base of transistor TR11 through the resistor R27, transistor TR11, which is normally on, will be turned off when the transistor TR10 is turned off. Since the collector of transistor TR11 is tied to the base of a transistor TR12 through the resistor R30, the transistor TR12 will, in turn, be turned off when the transistors TR10 and TR11 are turned off. Transistors TR11 and TR12 are normally biased on by the positive voltage V10 acting through the biasing resistors R28, R29, R30, R31 and R32.

It will be noted that the positive voltage V10 will normally (with error less than 1°) provide a current through the conducting transistor TR12, diode D12 and a transistor TR20 to ground. However, with transistor TR12 turned off, this circuit path is opened and the increased voltage upon the anode of a blocking diode D13 at the collector of TR12 will be high enough to cause a reverse current to pass through a zener diode Z2 to an integrating network comprising resistor R33 and capacitor C12. With an error greater than one degree in the 36-speed signal, the output from the transistor TR12 will therefore comprise a series of high voltage spikes occurring at the peaks of the synchro error signal which voltage spikes are stored in the capacitor C12 that directs a uniform current to the base of a transistor TR13 through a resistor R34.

It was pointed out that the current path through the transistor TR12 was normally grounded through the transistor TR20. The transistor TR20 is controlled by the error signal from the one-speed synchro by means to be disclosed hereinafter. By the configuration of the one-speed level detecting circuitry, the transistor TR20 will be "on" when the error is less than 2°. Thus, the transistors TR12 and TR20 are effectively "anded", i.e., they must both be "on" if a control signal is not to be passed to the transistor TR13. The reason for this tying together of the two error signals is the fact that the 36-speed synchro signal passes through 0 for every 5° of error. However, the one-speed synchro will only pass through 0 twice, i.e., at 0° error and at 180° error. Consequently, the emitter of transistor TR12 will only be grounded for the 2° error on each side of the 0° reference point even though transistor TR12 will be turned on at errors of 4°–6°, 9°–11°, 14°–16°<⅔, etc., as well as at errors of −1° to +1°.

When transistor TR13 is turned on the positive voltage from V10 will pass a current through a resistor R35 and the transistor TR13 to ground. When the transistor TR13 is off (for errors less than 1°) positive voltage V10 is applied through the resistors R35 and R36 to the base of a transistor TR27 to turn it on. This transistor then grounds the lead to the clamp switch 92 (FIG. 5) through the blocking diode 27 and effectively prevents the conduction of the peak pulses on line 94 to the sampling switch 82.

The response time for the operation of the transistor TR13 is controlled by the series-connected diodes D14, D15 and D16 which are placed in parallel with the integrating capacitor C12. When the error signal reaches a magnitude indicating a 1° error and transistor TR12 is turned off at the negative voltage peaks, the high voltage spikes that are applied to C12 will raise its voltage up to a predetermined maximum amount. This amount will be greater than that necessary to maintain the transistor TR13 in a conducting state and the remaining voltage can be grounded through the diodes D14, D15 and D16. Since the time constant of the R-C circuit comprising C12 and R33 must be sufficiently high in order to prevent transistor TR13 from turning off between the voltage spikes through the zener diode Z2, it will be recognized that if too great a voltage were applied to the capacitor C12 its discharge time would be long and an unreasonable delay would be required before the lead 94 to the sampling switch 82 could be clamped off as the error signal moved from errors greater than one degree to errors less than 1°. Of course, some delay in turning off transistor TR13 will occur as capacitor C12 discharges through the resistor R33, but this should be limited to but a few reference voltage cycles after the error decreases to a value below 1°.

It can be seen from FIG. 7 that the one-speed synchro error signal is received across the capacitor C13 and resistor R37 which causes a phase shift in the signal so that the one-speed signal will be synchronized with the synchro reference voltage, i.e., C13 and R37 perform the same function for the one-speed error signal as C10 and R20-R21 perform for the 36-speed error signal.

It will be noted that a positive voltage V11 is added to the one-speed error signal voltage through a resistor R75. This voltage, called the "anti-stickoff" voltage, is added to the one-speed error signal so that the one-speed and 36-speed error signals will not coincide at 180° error. If the signals were allowed to coincide, the control system would lock in not only at 0° but also at 180° since the 36-speed synchro would be in control and would be moving the system to the null point at 180° error. With the addition of a small positive voltage V11 (in the neighborhood of 2 volts) to the one-speed error signal, the error voltage from the one-speed synchro is shifted relative to ground so that it is positive from 2° to 178° and negative from 178° to 2°. The one-speed error signal is then re-zeroed or phase shifted so that the 0 voltage cross over point occurs at the same position as the 0 voltage crossover point of the 36-speed error signal, i.e., at 0° error; however, the other 0 voltage crossover point for the one-speed signal will be shifted by 4° so that it will occur at errors of 176°. Under these conditions the changeover from the one-speed error signal to the 36-speed error signal will occur at 174° error and the changeover from the 36-speed error signal to the one-speed error signal will occur at 178° error. Since the 36-speed error signal nulls at 175°, all error angles above 175° will cause the load to be driven in one direction toward the synchronization point while those error angles below 175° will cause the load to be driven in the opposite direction toward the synchronization point. At an indicated error of 180°, the control will be in the one-speed synchro and the 36-speed synchro error signal will not create a false synchronization point.

The one-speed error signal is applied to the base of a field effect transistor TR14 through a resistor R38. Voltages +V12 and −V12 of opposite polarity are applied to limiting circuits comprising diodes D17 and D18 and resistors R39, R40, R41 and R42 so that the maximum voltage that can be applied to the gate of the transistor TR14 will be low.

Transistors TR14 and TR15 comprise a two-stage amplifying circuit so that the output voltage applied across a resistor R47 to the base of a transistor TR16 is approximately the same as that applied across the resistor R24 to the base of the transistor TR10 in the 36-speed error signal detecting circuitry. Transistors TR14 and TR15 are biased from voltage V10 through resistors R43, R44, and R45. Capacitor C14 at the emitter of TR15 blocks the transfer of DC voltage to the base of transistor TR16 and the capacitor C15 grounds the AC error signal voltage and prevents it from being transferred to the 36-speed error signal detecting circuitry.

The circuits for the transistors TR16, TR17, TR18 and TR19 in the one-speed error signal detecting circuitry are similar to the circuits for the transistors TR10, TR11, TR12 and TR13 and the voltage levels are adjusted so that the 36-speed error signal detecting circuitry functions to turn on transistor TR13 when the error is greater than 1° while the one-speed error detecting circuitry functions to turn on the transistor TR19 when the error is greater than two degrees. The resistors R46 through R57, capacitors C16 and C17, diodes D20, D21 and D22, and the zener diodes Z3 and Z4 are similar to the resistors R23 through R34, capacitors C11 and C12, diodes D10, D11 and D13, and zener diodes Z1 and Z2, respectively, and perform similar functions.

Transistor TR19 is biased by the positive voltage V10 through a resistor R58 and a diode D23. When transistor TR19 is off, i.e., with errors less than 2° in the one-speed error signal, voltage V10 passes a current through resistor R58 and a diode D24 to the base of transistor TR20 thereby turning it on. As previously outlined, the transistor TR20 "ands" with the transistor TR12 in the 36-speed synchro error detecting circuitry so that the transistor TR13 will not turn off if TR20 is off even through transistor TR12 is turned on when the 36-speed error signal goes through a null position (as for example at errors of 5°, 10°, 15°, etc.). It will be apparent that at all errors greater than 2° (with the exception of errors from 174° to 178°) the transistor TR20 will be off thus blocking the passage of a grounding current through transistor TR12.

When the 36-speed synchro error signal is to be transmitted to the demodulator 80 it is conducted in line 140 through the field effect transistors TR22 and TR23 as previously pointed out. When the one-speed synchro error signal is to be transmitted to the demodulator it is picked up at the input to resistor R38 and is transmitted through the coupled field effect transistors TR25 and TR26 and the current limiting resistor R70 to the demodulator. It will be apparent, therefore, that the matched pairs of FET's TR22-TR23 and TR25-TR26 determine which error signal passes to the demodulator. The FET's are connected so that their gate and source leads are tied together; therefore, with 0 voltage between the gate and source the transistors are effectively shorted and the error signals of changing polarity will pass therethrough. When a voltage is connected between the gate and source of the transistors each transistor will block the passage of a signal on alternating half-cycles. It will be noted that the collector of transistor TR19 is connected through resistors R60 and R62 to a positive voltage V13. Resistor R62 also connects the emitter and base leads of a transistor TR21. When transistor TR19 is on, i.e., with errors of greater than 2°, the base of transistor TR21 is grounded through the resistor R60 thereby turning transistor TR21 on and passing a current from voltage source V13 through TR21, resistor R63, diode D25, resistor R61 and transistor TR19 to ground. This places a voltage across the resistor R63 which is seen between the source and gates of the field effect transistors TR22 and TR23 to thereby prevent any signal from passing therethrough. Consequently, at errors greater than 2° the 36-speed synchro signal will not be transmitted. At errors of less than 2°, transistor TR19 is off to thereby prevent TR21 from turning on and preventing the creation of a blocking voltage between the gate and sources of the FET's TR22 and TR23; thus, the FET's are shorted and the 36-speed synchro error signal is passed.

The circuitry controlling the coupled field effect transistors TR25 and TR26 is identical to the circuitry controlling the coupled field effect transistors TR22 and TR23. Resistors R65 through R69, transistor TR24 and diode D26 correspond to resistors R60 through R64, transistor TR21 and diode D25, respectively. Since transistor TR20 will be off at errors greater than 2° the transistor TR24 will not turn on under this condition and zero voltage will appear across resistor R68 between the gate and source of the field effect transistors TR25 and TR26 which will remain in their conducting states so that the one-speed synchro error signal will be passed to the demodulator. It will be apparent that when transistor TR20 is on (at errors less than 2°) the transistor TR24 will also be turned on to block the passage of a signal through TR25 and TR26 in the manner previously explained with respect to the transistors TR21, TR22 and TR23.

DEMODULATOR, SAMPLE AND HOLD UNIT AND SHAPING AMPLIFIER

The circuitry for the phase sensitive demodulator 80, the sampling switch 82, the integrating capacitor 84, and the non-linear shaping amplifier 86 is shown in FIG. 8. As determined by the level detector 74, either the 36-speed synchro error signal or the one-speed synchro error signal will be transmitted to the demodulator. The demodulator generally comprises a pair of half-wave rectifiers including switching transistors TR30 and TR31. Each of the transistors are driven by the 512 cps synchro power reference voltage which is supplied by transformer secondaries, the transistor TR30 being driven from transformer secondary TS3 through current limiting resistors R80 and R81 and the transistor TR31 being driven from the transformer secondary TS4 through current limiting resistors R83 and R84. The transistors are wired to the transformer secondaries in such a manner that they are turned on during alternate half-cycles. Consequently, when one transistor is passing the negative half-cycles of the error signal, the other transistor will be passing the positive half-cycles. Since the error signal, whether obtained from the one-speed or the 36-speed synchro, will be in phase or out of phase with the 512 cps synchro power reference voltage depending upon whether the error signal is requesting a clockwise or a counterclockwise rotation of the load, each of the transistors will pass both positive or negative half-cycles (although not at the same error polarity). For example, the transistor TR30 will be turned on during the positive half-cycles of the synchro power reference voltage; if the error signal is in phase with the synchro power reference voltage, then positive half-cycles of the error signal will be transmitted through the current limiting resistor R85 to the non-inverting input of an operational amplifier A7, and, if the error signal is out of phase with the synchro power reference voltage, then the negative half-cycle of the error signal will be transmitted to the non-inverting input of operational amplifier A7. Transistor TR31, on the other hand, is turned on by the negative half-cycles of the synchro power reference voltage. If the error signal is in phase with the synchro power reference voltage, then negative half-cycles of the error signal will be transmitted through the transistor TR31 and a current limiting transistor R84 to the inverting input of the operational amplifier A7; and if the error signal is out of phase with the synchro power reference voltage, then positive half-cycles of the error signal be transmitted to the inverting input of the operational amplifier A7. Since the operational amplifier inverts the inputs from transistor TR31 and does not invert the inputs from transistor TR30, the output of the amplifier will be a rectified signal either positive or negative depending upon whether or not the error signal is in phase with the synchro power reference voltage or out of phase with the synchro power reference voltage, respectively.

As the operational amplifier A7 is chosen to have a very high gain, the gain of the signal through the inverting input will be determined by the ratio of input resistors R84 and R86 and a feedback resistor R88. The gain through the non-inverting input of the operational amplifier is determined by the ratio of input resistors R85 and R87. For good design purposes the resistors R86 and R87 are matched and the other resistor values are chosen so that the gain through both the inverting and non-inverting inputs will be the same.

The output of the operational amplifier A7 is provided across a resistor R89 and is directed into the sampling switch 82 through a resistor R100. The value of the resistor R100 is chosen so that the time constant in the RC circuit comprising resistor R100 and capacitor 84 will be low enough to integrate high frequencies, i.e., frequencies appreciably above 512 cycles per second, in order to prevent erroneous error signals developed in the switching and demodulating circuitry from being converted into the DC error signal which controls the movement of the load.

The sampling switch 82 comprises a switching transistor TR32 which is similar to the transistors TR30 and TR31 and which is driven from the secondary of a transformer TS5 through current limiting resistors R96 and R97. The primary of transformer TS5 is connected to line 94 to receive the output from the peak detector 96, i.e., short duration pulses at 1,024 cycles per second, when the line 94 from the peak detecting circuitry is not clamped off. Under such conditions the transistor TR32 will conduct at the peaks of the synchro power reference voltage for short periods of 150–200 microseconds. Since the peaks of the rectified error signal will coincide with the peaks of the synchro power reference voltage, the peaks of the rectified error signal will be passed through the transistor TR32 to the integrating capacitor 84; thus, the envelope of the error signal which represents the magnitude of the error is sensed and stored upon the capacitor. AS previously pointed out, the time constant of the resistor R100 and capacitor 84 circuit is low enough that high frequencies are integrated out which factor is necessary since high frequency noise is developed particularly during the switching on and off of the transistor TR32. The time constant of the circuitry must be high enough, however, that capacitor 84 will charge to the level of the pulses from the demodulator between each pulse, i.e., the capacitor 84 must follow the rectified error signal precisely at 512 cycles per second.

The non-linear shaping amplifier circuitry 86 is seen to comprise an operational amplifier A8, similar to the operational amplifier A7, which is adapted to receive the output from the integrating capacitor 84. Amplifier A8 is provided with feedback circuitry provided by resistors R91–95 and zener diodes Z5–Z10 so that the gain is made non-linear. This is necessary especially when the control system is synchronizing to an order, i.e., when the error is high. The gain should be reduced at the higher error signals in order to prevent overshoot as the error is subsequently reduced. However, because of the inherent attenuation of gain in the synchro output signal, gain must be artificially increased at the highest error levels. For low error signals, the matched pairs of zener diodes Z7 and Z8, Z9 and Z10, and Z5 and Z6 will not be conducting so that the gain will be determined by the single feedback resistor R93. At a slightly higher error voltage one of the zener diodes Z7 or Z8 (depending upon the polarity of the error signal) will break down to place a resistor R94 which is of a smaller value than resistor R93 in the feedback circuit path. This has the effect of increasing the feedback current and thereby reducing the gain. At a still higher error signal voltage, one of the zener diodes Z9 or Z10 will break down to permit feedback current through a still smaller resistor R95 to reduce the gain even further. However, when the error signal becomes very large, one of the matched pair of zener diodes Z5 or Z6 will break down to pass a portion of the feedback current through the resistor R92 to ground to thereby increase the gain. As pointed out hereinbefore, the final increase in gain at high error levels is necessary to offset the inherent attenuation of the synchro output signal at high levels.

The operational amplifiers A7 and A8 as used in the demodulating and shaping circuitry may be integrated circuits identified by catalog number 3074/17 manufactured by Burr-Brown Research Corp. of Tucson, Arizona. The switching transistors TR30, TR31 and TR32 must be bipolar transistors in order to pass current in both directions.

SUMMARY

It can be seen that the control system of the present invention provides a highly reliable and accurate way of interfacing digital input orders with an analog output system including synchro control transformers operating in a load positioning servomechanism. While conventional procedures are utilized to convert the digital position signals into analog synchro signal voltages, novel combinations of digital and analog components are provided in order to provide a smooth transition from the discontinuous input level to the continuous output level. An updater and a sample-and-hold unit are provided in the digital and the analog portions of the circuitry, respectively, and their functions are correlated in order to maintain maximum accuracy and smoothness in the servomechanism response. The sample-and-hold unit is used to maintain a continuous error signal and the magnitude of the error signal is detected only when appropriate. Thus, whether the rotating load is slewing, i.e., moving at maximum velocity toward an ordered position, or whether it is moving at or near synchronization, the control system will promote stability and prevent a rough response.

A feature of the present invention is the use of an artifically derived velocity order which is summed with the position error signal to maintain the drive to the load. Thus, the presence of a position error signal is not necessary in order to maintain a velocity in the load. The specially designed digital-to-analog converter circuitry for the conversion of the digital velocity signal to a DC voltage is made phase sensitive so that the DC voltage may be either negative or positive in accordance with the desired direction of rotation of the load.

Although the best mode contemplated for carrying out the present invention has been herein shown and described, it will be apparent that modification and variation may be made without departing from what is regarded to be the subject matter of the invention.

What is claimed is:

1. A control system for a rotatably mounted load, said system being adapted to accept digital signals with each signal being comprised of a plurality of pulses which collectively are representative of the desired instantaneous angular position and the angular velocity of said load, said system comprising means for separating the digital velocity signals from the digital position signals, a first digital-to-analog converter for converting said digital velocity signals to a direct-current signal, a position holding register for receiving and storing said digital position signals, means responsive to said digital velocity signals for continuously updating said position signals in said position holding register a plurality of times between the reception of successive digital position signals by said system, a synchro control transformer, a second digital-to-analog converter for converting said digital position signals to an input signal to the stator windings of said synchro control transformer, means mechanically connecting said load to the rotor of said synchro control transformer whereby the output of said transformer on the windings of said rotor is an error signal representative of the instantaneous error between the position indicated by the digital position signal in said holding register and the position of said load, means for demodulating said error signal to provide a direct-current signal proportional to said instantaneous error, means for summing said direct-current signal from said first digital-to-analog converter with said direct-current signal from said demodulating means, and drive means connected to said load and arranged to be driven by the signal output of said summing means.

2. A control system according to claim 1 including means for supplying said second digital-to-analog converter with an alternating synchro power voltage for carrying the digital position information, a sample-and-hold device connected to receive the output of said demodulating means, and control means for operating said sample-and-hold device so that said error signal is sampled only on the peaks of said synchro power voltage.

3. A control system according to claim 2 wherein said control means normally causes said error signal to be sampled only when said digital position order is current, and error detecting means for detecting the presence of an error signal greater than a predetermined amount for altering the normal operation of said control means to cause said error signal to be sampled on all peaks of said synchro power voltage.

4. A control system according to claim 2 wherein said sample-and-hold device comprises a peak detector for providing short duration pulses at the negative and positive peaks of said synchro power voltage, a bipolar transistor switch driven by said short duration pulses, and a capacitor connected to receive the output from said switch.

5. A control system according to claim 1 including a velocity holding register for receiving and storing said digital velocity signals, and an amplifier for receiving the output of said first digital-to-analog converter, said amplifier having an inverting and a non-inverting input, said first digital-to-analog converter being arranged to receive said digital velocity signals from said velocity holding register and to convert said signals to a direct-current signal of reversible polarity, and means for providing the output of said first digital-to-analog converter at one of said inputs to said amplifier in accordance with the polarity of said direct-current signal.

6. A control system according to claim 5 wherein said velocity holding register is arranged to store a sign bit representative of the polarity of the velocity signal in said register, and a clamping circuit for clamping one of the inputs to said amplifier when said sign bit is in one state and for clamping the other of the inputs to said amplifier when said sign bit is in the opposite state.

7. A control system according to claim 1 including a velocity holding register for receiving and storing said digital velocity signals, said updating means comprising means for dividing the indicated digital quantity in said velocity holding register by a given factor, means for adding the result of said dividing means to the indicated digital quantity in said position holding register to provide an updated digital position signal, and means for transferring said updated digital position signal to said position holding register, each of said means comprising said updating means being operated at a frequency corresponding to the frequency at which said digital position and velocity signals are received times said factor.

8. A control system according to claim 7 wherein said dividing means comprises a binary adding register operable to shift said digital velocity signal by a number of digits corresponding to the binary representation of said factor, said adding means comprises a holding register operable to add the digital sum from said binary adding register to the digital sum previously stored therein.

9. A control system according to claim 8 including means for locking out the transfer of the digital sum in the updater holding register to said position holding register when a new digital position signal is received by said control system.

10. A control system according to claim 3 wherein said control means includes a monostable multivibrator for producing a pulse in response to the reception of a digital position signal by said control system with said pulse having a duration corresponding to one to three peaks of said synchro power voltage, a peak detector for detecting the peaks of said synchro power voltage and for providing short duration pulses to said sample-and-hold device, and clamping means connected to said multivibrator and to said error detecting means for clamping off the output of said peak detector except when said pulse from said vibrator is present or when said error detecting means indicates the presence of an error signal greater than said predetermined amount.

11. A control system for a rotatably mounted load, said system being adapted to accept digital signals with each signal being comprised of a plurality of pulses which collectively are representative of the desired instantaneous angular position and angular velocity of said load, said system comprising conversion means for converting said digital position signals to analog signals in the form of synchro stator input voltages, a synchro control transformer arranged to receive said synchro stator input voltages, means for supplying an alternating synchro power signal to said conversion means having a frequency which is greater than the frequency at which said digital signals are accepted by said system, means for mechanically connecting the rotor of said synchro to said load whereby the error signal on the rotor winding is representative of the error between the desired angular position of the load and the actual angular position of the load, power drive means capable of utilizing said error signal for rotating said load at a velocity and in a direction in accordance with said signal, a sampling switch for controlling the transmission of said error signal to said power drive means, first control means for operating said sampling switch whereby said error signal is transmitted to said power drive means only at the time when a new digital position signal is received by said system, integrating means for providing a continuous output from said sampling switch to said power drive means, and second control means operative when said error signal is greater than a predetermined amount for increasing the frequency of operation of said sampling switch by operating said sampling switch at the peaks of said synchro power signal.

12. A control system according to claim 11 including a peak detector for detecting the peaks of said synchro power signal and for providing a continuous series of short duration pulses coinciding with said peaks for closing said sampling switch for a continuous series of uniformly spaced time periods, said first and second control means comprising a clamping circuit for clamping the output of said peak detector and preventing the closing of said sampling switch.

13. A control system according to claim 12 wherein said first control means comprises means for providing a pulse in response to the reception of a digital signal by said control system with said pulse having a duration corresponding to the time required for from one to three peaks of said synchro power signal with said pulse being provided to said clamping circuit to unclamp said peak detector.

14. A control system according to claim 12 wherein said second control means comprises a level detector for detecting the magnitude of said error signal and for providing a pulse to said clamping circuit to unclamp said peak detector.

15. A control system according to claim 12 including a phase-sensitive demodulating means for converting said error signal into a direct-current signal of reversible polarity with the output of said demodulating means being connected to said sampling switch.

16. A control system according to claim 11 including updating means responsive to the digital velocity signals for updating said digital position signals a number of times between the reception of each position signal by said system.

17. A control system according to claim 16 including a velocity holding register for receiving and storing said digital position signals received by said system; said updating means comprising means for dividing the indicated digital quantity in said velocity holding register by a given factor, means for adding the result of said dividing means to the indicated digital quantity in said position holding register to provide an updated digital position signal, and means for transferring said updated digital position signal to said position holding register, each of said means comprising said updating means operated at a frequency corresponding to said frequency at which said digital signals are received by the system times said factor.

18. A control system according to claim 17 wherein said dividing means comprises a binary adding register operable to shift said digital velocity signal by a number of bits corresponding to the binary representation of said factor and said adding means comprises a holding register operable to add the digital sum from said binary adding register to the digital sum previously stored therein.

19. A control system according to claim 18 including means for locking out the transfer of the digital sum in the updater holding register to said position holding register when a new digital position signal is received by said control system.

20. A control system according to claim 15 including means for converting said digital velocity signals to a direct-current signal of reversible polarity, and means for summing the demodulated error signal and the direct-current signal derived from said velocity signals with the output thereof being connected to said power drive means for rotating said load in a direction and at a velocity in accordance with the sign and the magnitude of the output of said summing means respectively.

21. A control system for rotatably mounted load, said system being adapted to accept digital signals with each signal being comprised of a plurality of pulses which collectively are representative of the desired instantaneous angular position and angular velocity of said load, said digital position signals and digital velocity signals being received at a given frequency, said system comprising conversion means for converting said digital position signals to analog signals in the form of synchro stator input voltages, a pair of synchro control transformers arranged to receive said synchro stator input voltages with one synchro control transformer being arranged to accept analog signals which correspond to some multiple of the signals accepted by the other synchro control transformer, means for supplying an alternating synchro power signal to said conversion means having a frequency which is greater than the frequency at which said digital signals are received by said system, means for separately mechanically connecting the rotors of each of said synchro control transformers to said load whereby the error signal on the rotor windings of said synchros is representative of the error between the desired angular position of the load and the actual angular position of the load with the error signal from said one synchro corresponding to a multiple of the error signal on said other synchro, power drive means capable of utilizing one of said error signals for rotating said load at a velocity and in a direction in accordance with said signal, a sampling switch for controlling the transmission of one of said error signals to said power drive means, first control means for operating said sampling switch whereby one of said error signals is transmitted to said power drive means only at the time when a new digital position signal is received by said system, integrating means for providing a continuous output from said sampling switch to said power drive means, second control means operative when one of said error signals is greater than a predetermined amount for increasing the frequency of operation of said sampling switch by operating said sampling switch at the peaks of said synchro power signal, and third control means operative when one of said error signals is greater than a predetermined amount for connecting said one error signal to said sampling switch and disconnecting the other error signal therefrom.

22. A control system according to claim 21 wherein said control means include a level detector connected to receive both of said error signals from said synchro control transformers but to permit only one of said error signals to be transmitted to said sampling switch, said level detector being operative to sense the magnitude of each of said error signals and being arranged to operate said sampling switch at the peaks of said synchro power signal when one of said error signals is greater than a first amount and being arranged to switch the output thereof to said other of said error signals when said other of said error signals is greater than a second amount which second amount represents an error of a magnitude greater than that represented by said first amount.

23. A control system according to claim 22 wherein the magnitude sensing means for each of said error signals are connected together in series so that said sampling switch is always operated at the peaks of said synchro power signal when said other of said error signals is greater than said second amount even though said one of said error signals is less than said first amount.

24. A control system for a rotatably mounted load, said system being adapted to accept digital signals with each signal being comprised of a plurality of pulses which collectively are representative of the desired instantaneous angular position and the angular velocity of said load, said system comprising means for separating the digital velocity signals from the digital position signals, a first digital-to-analog converter for converting said digital velocity signals to a direct-current signal, a synchro control transformer, a second digital-to-analog converter for converting said digital position signals to an input signal to the stator windings of said synchro control transformer, the rotor of said synchro control transformer being arranged to be mechanically connected to said load whereby the output of said transformer on the windings of said rotor is an error signal representative of the instantaneous error between the position indicated by the digital position signal at the input of said system and the position of said load, means for demodulating said error signal to provide a direct-current signal proportional to said instantaneous error, means for summing said direct-current signal from said first digital-to-analog converter with said direct-current signal from said demodulating means, the output of said summing means being adapted to control the drive means connected to said load, and a sample-and-hold device connected so as to sample said error signal only at certain times and to permit only the sampled error signal to be transmitted to said summing means.

25. A control system according to claim 24 including means for supplying said second digital-to-analog converter with an alternating synchro power voltage for carrying the digital position information, said sample-and-hold device being connected to receive the output of said demodulating means, and control means for operating said sample-and-hold device so that said error signal is sampled only on the peaks of said synchro power voltage.

26. A control system according to claim 25 wherein said control means normally causes said error signal to be sampled only at those times when a digital position order has just been received by said system and is current, and error detecting means for detecting the presence of an error signal greater than a predetermined amount for altering the normal operation of said control means to cause said error signal to be sampled on all peaks of said synchro power voltage.

* * * * *

PO-1050
(5/69)

UNITED STATES PATENT OFFICE
CERTIFICATE OF CORRECTION

Patent No. 3,662,242      Dated May 9, 1972

Inventor(s) Wacker et al

It is certified that error appears in the above-identified patent and that said Letters Patent are hereby corrected as shown below:

| | |
|---|---|
| Column 1, line 15: | delete "of the response limitations". |
| Column 8, line 51: | change "and" to --or--. |
| Column 11, line 2: | change "setting" to --settling--; |
| line 5: | after "one" (first occurrence) insert -- / --. |
| Column 12, line 65: | delete "$\leq 2/3$," |
| Column 19, line 45: | after "digital" insert --velocity--, |
| line 46: | delete "position", |
| line 46: | after "system;" insert --and a position holding register for receiving and storing said digital position signals received by said system;--. |

Signed and sealed this 12th day of December 1972.

(SEAL)
Attest:

EDWARD M. FLETCHER, JR.
Attesting Officer

ROBERT GOTTSCHALK
Commissioner of Patents